(12) United States Patent
Dullanty et al.

(10) Patent No.: US 7,818,293 B2
(45) Date of Patent: Oct. 19, 2010

(54) METHOD AND SYSTEM TO SYNCHRONIZE UPDATED VERSIONS OF A DOCUMENT EDITED ON A COLLABORATIVE SITE THAT ARE UNDER DOCUMENT MANAGEMENT CONTROL

(75) Inventors: Edward J. Dullanty, Bellevue, WA (US); Tara Lynn Freedman, Bothell, WA (US); Thomas Mayer Freedman, Bothell, WA (US)

(73) Assignee: International Business Machines Corporation, Armonk, NY (US)

( * ) Notice: Subject to any disclaimer, the term of this patent is extended or adjusted under 35 U.S.C. 154(b) by 372 days.

(21) Appl. No.: 11/968,534

(22) Filed: Jan. 2, 2008

(65) Prior Publication Data
US 2009/0172043 A1    Jul. 2, 2009

(51) Int. Cl.
*G06F 17/30* (2006.01)
(52) U.S. Cl. .................................... 707/610
(58) Field of Classification Search ............. 707/2, 707/203, 610; 709/204
See application file for complete search history.

(56) References Cited

U.S. PATENT DOCUMENTS

| | | | |
|---|---|---|---|
| 6,681,369 B2* | 1/2004 | Meunier et al. ............. | 715/255 |
| 6,865,599 B2 | 3/2005 | Zhang | |
| 6,947,991 B1* | 9/2005 | Burton et al. ............... | 709/227 |
| 7,058,667 B2* | 6/2006 | Goldick ...................... | 707/203 |
| 7,069,505 B2 | 6/2006 | Tamano | |
| 2004/0059941 A1* | 3/2004 | Hardman et al. ............ | 713/201 |
| 2004/0122897 A1* | 6/2004 | Seelemann et al. .......... | 709/204 |
| 2005/0216506 A1 | 9/2005 | Theilmann et al. | |
| 2006/0074846 A1 | 4/2006 | Feinberg et al. | |
| 2006/0080432 A1 | 4/2006 | Spataro et al. | |
| 2006/0136513 A1 | 6/2006 | Ngo et al. | |
| 2006/0235984 A1 | 10/2006 | Kraus et al. | |
| 2006/0259524 A1 | 11/2006 | Horton | |
| 2008/0059348 A1* | 3/2008 | Glassman et al. ............. | 705/35 |

OTHER PUBLICATIONS

Shanks, Bayle, "WikiGateway: a library for interoperability and accelerated wiki development", ACM WikiSym, Oct. 2005, 14 Pages.
Shanks, Bayle, "WikiGateway: A Toolbox for Making Software that Reads and Writes Wikis", ACM WikiSym, Aug. 2006, 2 Pages.

(Continued)

*Primary Examiner*—Etienne P LeRoux
(74) *Attorney, Agent, or Firm*—Patterson & Sheridan, L.L.P.

(57) ABSTRACT

A method and system for synchronizing versions of a document on a collaborative site and on a content management repository is disclosed. The method and system comprises determining that a document has been modified on the collaborative site by a listener/updater mechanism. The method and system further comprises providing a hidden save of a copy of the document to the content management repository by an authorized user of the collaborative site. In one embodiment, a system and method in accordance with the present invention uses the Web-based Distributed Authoring and Versioning (WebDAV) protocol. This listener/updated mechanism permits users to retain the highly-collaborative aspect of wikis, but automatically updates and retains the document in a more formal content management repository making it available for other Content Management applications.

21 Claims, 2 Drawing Sheets

OTHER PUBLICATIONS

Shen, Haifeng, et al., "A Generic WebDAV-based Document Repository Manager for Collaborative Systems", Proceedings of the 2006 IEEE/WIC/ACM International Conference on Web Intelligence, 2006, 5 Pages.

SpringCM, "On-demand Document Management and Workflow", http://www.springcm.com, 2007, 2 Pages.

Hyperwave AG, "Enterprise Content Management ECM + Real Time Collaboration +eLearning", http://www.hyperwave.com/e/, 2007, 1 Page.

Jive Software, "Overview "Clearspace API (1.9.0) Core Javadocs),http://www.jivesoftware.com/builds/docs/clearspace/latest/javadoc/api/overview-summary.html, 1 Page.

JotSpot "Wiki Data | Export Your Wiki Data | Wiki XML", http://www.jot.com/tours/applications/8-wiki-export.php, 1 Page.

Open Text Corporation, "Document Management & Collaboration", http://www.opentext.com/2/sol-products/sol-pro-docmgmt-collaboration.htm, 2007, 2 Pages.

Thoeny, Peter, "The Open Source Wiki for the Enterprise", http://twiki.org/, Dec. 2007, 6 Pages.

Wilper, Chris, "WebCache Intro and Q&A", http://www.dmdeveloper.com/articles/products/webcache.html, Dec. 2002, 4 Pages.

DocMGR Wiki, "DocMGR", http://wiki.docmgr.org/index.php/DocMGR, Mar. 2007, 5 Pages.

* cited by examiner

METHOD AND SYSTEM TO SYNCHRONIZE UPDATED VERSIONS OF A DOCUMENT EDITED ON A COLLABORATIVE SITE THAT ARE UNDER DOCUMENT MANAGEMENT CONTROL

FIELD OF THE INVENTION

The present invention relates generally to database systems and more specifically to synchronizing a document made available for edits on a public site with its copy that is under content management repository.

BACKGROUND OF THE INVENTION

At present, companies that use both a collaborative site (such as a wiki site) and a content management repository have no automated means to constantly keep new additions to the individual documents on the collaborative sites up to date with the copies stored in the content management repository. Therefore, at present, the result is a significant amount of manual work if the content management repository is to be kept completely up to date.

Companies that use a formal document management system (such as FileNet Content Engine) also want to take advantage of using a collaborative tool for cross-team collaboration on project documents. In such instances it is very easy for the documents on the collaborative site to become out of synchronization with the copy that is managed by the content management repository. A content management repository is highly controlled which makes it harder for collaborative content generation. A collaborative site typically does not limit permissions to a document nor does it give access into any of the other options offered by a content management repository such as using new major versions of a document to launch a business process workflow. Accordingly, what is desired is a system which allows for a synchronization of document versions edited on a collaborative site but managed as part of a content management repository. The present invention addresses such a need.

SUMMARY OF THE INVENTION

A method and system for synchronizing versions of a document edited on a collaborative site and managed in a content management repository is disclosed. The method and system comprises determining that a document has been modified on the collaborative site by a listener/updater mechanism. The method and system further comprises providing a hidden save of a copy of the document from the site to the content management repository by an authorized user of the collaborative site by an updater mechanism. In one embodiment, a system and method in accordance with the present invention uses the Web-based Distributed Authoring and Versioning (WebDAV) protocol as the updater mechanism. This listener/updater mechanism permits users to take advantage of the highly-collaborative aspect of wikis, but automatically updates and retains the document in a more formal content management repository making it available for other content management applications.

DETAILED DESCRIPTION OF PREFERRED EMBODIMENTS

Figure 1:
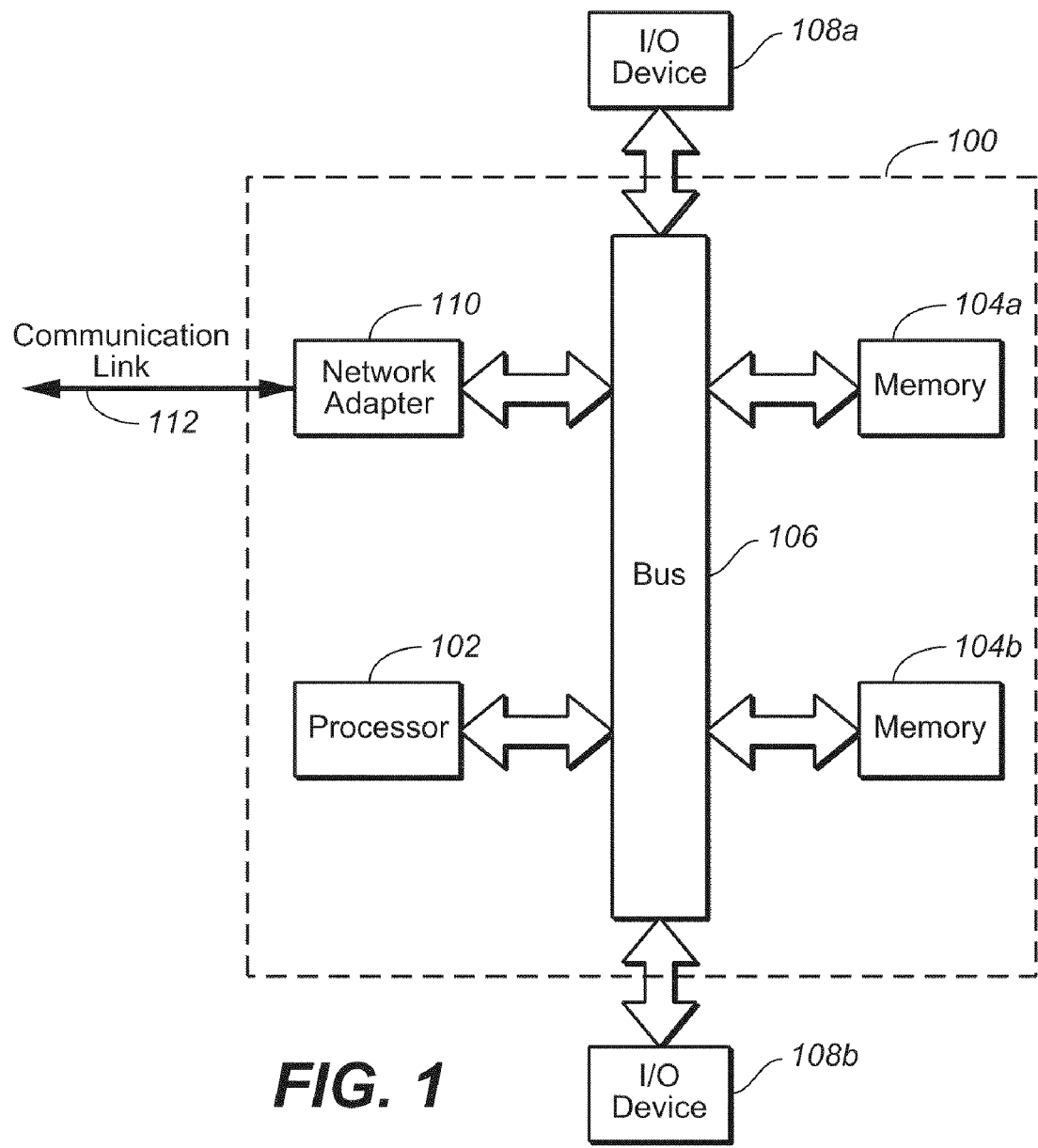
FIG. 1 depicts a data processing system suitable for storing and/or executing program code related to the updating process.

The present invention relates generally to database systems and more specifically to synchronizing collaborative versions that are under content management repository. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

A system and method in accordance with the present invention will be described in the context of a wiki site. However, one of ordinary skill in the art readily recognizes that the system and method could be utilized in a variety of collaborative sites and that use would be within the spirit and scope of the present invention.

A method and system provides for an automatic document update to saved versions of object using a listener/updater mechanism to synchronize versions of a document edited on a wiki site that are under content management repository. The method and system includes features of (1) providing a hidden tool that can be added to a wiki page for keeping the document(s) used on the wiki site updated in the content management repository, (2) keeping the two copies in synch, (3) performing a save by an author on the wiki site who may not have a login/security access to the content management repository, and (4) and enabling that major and minor updates to the wiki site would be captured in the new version in the content management repository and versioned as such.

A system and method in accordance with the present invention, by using an attachment listener/updater mechanism that is closely coupled to a document and/or to a particular class of documents, retains the highly-collaborative aspect of editing documents on wiki sites. A system and method contained in the listener/updater mechanism uses a document management protocol such as the Web-based Distributed Authoring and Versioning (WebDAV), to perform the automatic content repository updates and retains the document version in a more formal content management repository making it available for other content management applications.

Highly collaborative document content creation is provided via the wiki site, open to any who have rights to the site, even those outside the content management repository.

Once the document is managed within document management high value business processes can operate on the document such as workflows or the document can participate in records retention processes. Furthermore complex searching capability is possible by leveraging all the benefits of using a content management repository. To describe the features of the present invention in more detail refer now to the following description in conjunction with the accompanying figures.

A system that utilizes an updating and retaining process in accordance with the present invention can take the form of an entirely hardware implementation, an entirely software implementation, or an implementation containing both hardware and software elements. In one implementation, this disclosure is implemented in software, which includes, but is not limited to, application software, firmware, resident software, microcode, etc.

Furthermore, this updating and retaining process can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

FIG. 1 depicts a data processing system 100 suitable for storing and/or executing program code related to the updating and retaining process. Data processing system 100 includes a processor 102 coupled to memory elements 104a-104b through a system bus 106. In other implementations, data processing system 100 may include more than one processor and each processor may be coupled directly or indirectly to one or more memory elements through a system bus.

Memory elements 104a-104b can include local memory employed during actual execution of the program code, bulk storage, and cache memories that provide temporary storage of at least some program code in order to reduce the number of times the code must be retrieved from bulk storage during execution. As shown, input/output or I/O devices 108a-108b are coupled to data processing system 100. I/O devices 108a-108b may be coupled to data processing system 100 directly or indirectly through intervening I/O controllers (not shown).

In the implementation, a network adapter 110 is coupled to data processing system 100 to enable data processing system 100 to become coupled to other data processing systems or remote printers or storage devices through communications link 112. Communication link 112 can be a private or public network. Modems, cable modems, and Ethernet cards are just a few of the currently available types of network adapters.

Figure 2:
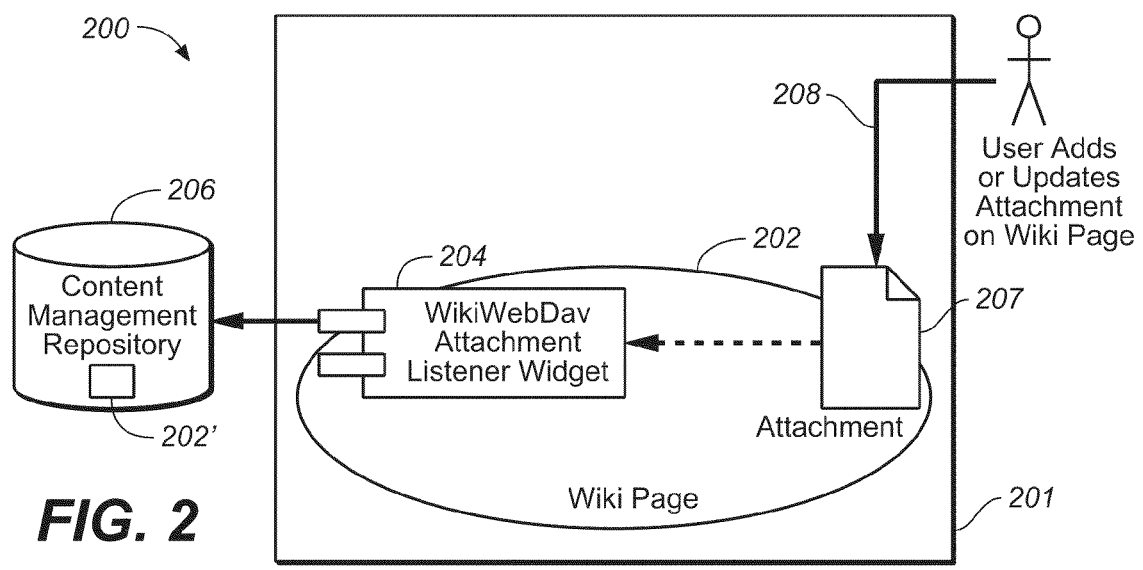
FIG. 2 is a simple block diagram of a system for updating and retaining copies of a wiki documents between a wiki site and a content management repository in accordance with the present invention.

FIG. 2 is a simple block diagram 200 of a system for updating and retaining copies of a wiki document 202 between a wiki site 201 and the copy of the same document 202' stored a content management repository 206 in accordance with the present invention. The block diagram 200 includes a wiki document 202, an attachment listener/updater mechanism 204 which is closely coupled to the wiki document 202 on a wiki site 201 and a content management repository 206. The attachment listener/updater mechanism 204, which remains a "hidden" attachment to the wiki article document 202, will immediately and constantly monitor the document 202.

One example of a closely coupled attachment listener/updater mechanism 204 is where the updater portion uses WebDAV. WebDAV is an extension of the HTTP/1.1 protocol that allows clients to perform remote web content authoring operations. The purpose of WebDAV is to make the web a readable and writeable medium. WebDAV provides functionality to create, change and move documents on a remote server (typically a web server or "web share"). This is useful, among other things, for authoring the documents which a web server serves, but it can also be used for general web-based file storage that can be accessed from anywhere. Many content repositories are WebDav enabled thus permitting access to the content repository via calls from a WebDav protocol.

Figure 3:
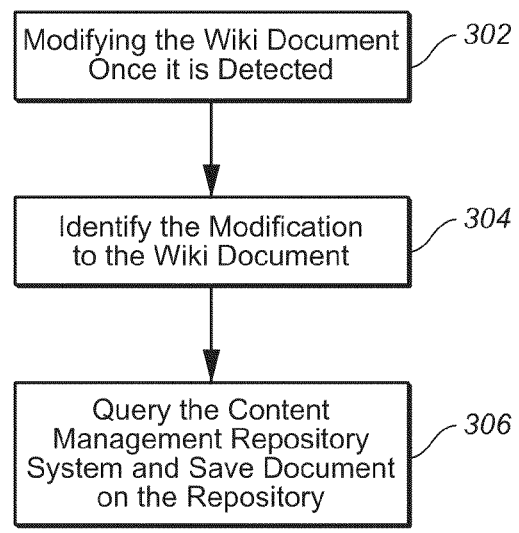
FIG. 3 is a flow chart which illustrates the process of updating and retaining copies of a wiki document between versions posted on a wiki and the copy stored in a content management repository.

FIG. 3 is a flow chart which illustrates the process of updating and retaining copies of a wiki document between a wiki site and a content management repository. Referring back to FIGS. 2 and 3 together, when the wiki document 202 on the wiki site is modified via an update 208, via step 302, the listener/updater mechanism 204 will immediately identify there has been a modification to the document 202, via step 304. The listener/updater mechanism then queries the content management repository 206 and immediately saves the copy of the document 202' on the content management repository 206, via step 306. The listener/updater mechanism 204 performs a hidden but immediate save on the content management repository using, for example, a known user login to the content management repository that has access rights to update the document in question. Therefore, both document instances 202 and 202' remain in synchronization automatically. The updates to the document 202 are performed by an author on the wiki site who may or may not have a login/security access to the content management repository. By implementing the listener/updater mechanism 204 so that any person who has rights to the wiki will have an update made in the content repository by a single known user id in the content repository secure access to the content repository is maintained. Major and minor updates to the wiki site could be captured in the new version in the content management repository and versioned as such, using FileNet's Content Engine, for example.

In one embodiment, the listener/updater mechanism 204 is closely coupled or dedicated to a particular document (or particular class of documents that are linked on the wiki site 201) and is constantly aware of an update. For example, an update may be an addition of a new section to the document 202. In an embodiment, the listener/updater mechanism 204 will look for a modification to an attachment 202. Accordingly, the listener/updater mechanism 204 would be looking for a change, for example in one or more file properties of the document/attachment 202. A file property may include but is not limited to document title, date modified, type of document (.doc, .xls), or size. Accordingly, upon predetermined criteria being met that indicates a change in the document, the listener/updater mechanism 204 would then make the appropriate calls to the content management repository 206 to update the copy 202' in the repository 206.

In one embodiment of the present invention, WebDAV can be utilized with FileNet's content engine to provide this updating system. However, one of ordinary skill in the art readily recognizes that a system and method in accordance with the present could be provided with any managed content management solution.

Accordingly, a highly collaborative document content creation is provided via the wiki site 201, open to any who have rights to the site 201, even those outside the document content management repository 206.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method, comprising:

synchronizing a first version of a document stored in a content management system with a second version of the document contained on a collaborative site, upon detecting at least one modification to the second version of the document, comprising:

monitoring the second version of the document contained on the collaborative site using a dedicated listener process that has a predefined association to the second version of the document, and that monitors for changes to the second version of the document and does not monitor other documents on the collaborative site;

detecting the at least one modification to the second version of the document using the dedicated listener process, wherein the second version of the document on the collaborative site is editable by a plurality of users of the collaborative site, and wherein the at least one modification is received from a first user of the plurality of users of the collaborative site; and upon detecting the at least one modification to the second version of the document on the collaborative site, updating the first version of the document stored in the content management repository, based on the at least one modification to the second version of the document, and using credentials of an authorized user of the content management repository.

2. The method of claim 1, wherein updating the first version of the document stored in the content management repository is implemented utilizing Web-based Distributed Authoring and Versioning (WebDAV) protocol.

3. The method of claim 1, wherein the collaborative site comprises a wiki site.

4. The method of claim 1, wherein the authorized user of the content management repository is an administrator of the collaborative site, and wherein the authorized user of the content management repository is different from the first user of the collaborative site.

5. The method of claim 1, wherein monitoring the second version of the document contained on the collaborative site is performed using a dedicated listener process that exclusively monitors the second version of the document on the collaborative site.

6. The method of claim 1, wherein monitoring the second version of the document contained on the collaborative site is performed using a dedicated listener process that exclusively monitors a particular class of documents, and wherein second version of the document contained on the collaborative site is a member of the particular class of documents.

7. The method of claim 1, wherein the at least one modification to the second version of the document on the collaborative site comprises a change to contents of the second version of the document.

8. The method of claim 1, wherein the at least one modification to the second version of the document on the collaborative site comprises a change to an attachment associated with the second version of the document.

9. The method of claim 8, wherein the attachment has changed if one or more file properties of the attachment have changed.

10. A computer-readable storage medium containing a program that, when executed, performs an operation comprising:

synchronizing a first version of a document stored in a content management system with a second version of the document contained on a collaborative site, upon detecting at least one modification to the second version of the document, comprising:

monitoring the second version of the document contained on the collaborative site using a dedicated listener process that has a predefined association to the second version of the document, and that monitors for changes to the second version of the document and does not monitor other documents on the collaborative site;

detecting the at least one modification to the second version of the document using the dedicated listener process, wherein the second version of the document on the collaborative site is editable by a plurality of users of the collaborative site, and wherein the at least one modification is received from a first user of the plurality of users of the collaborative site; and upon detecting the at least one modification to the second version of the document on the collaborative site, updating the first version of the document stored in the content management repository, based on the at least one modification to the second version of the document, and using credentials of an authorized user of the content management repository, wherein the authorized user of the content management repository is different from the first user of the collaborative site.

11. The computer-readable storage medium of claim 10, wherein updating the first version of the document stored in the content management repository is implemented utilizing Web-based Distributed Authoring and Versioning (WebDAV) protocol.

12. The computer-readable storage medium of claim 10, wherein the collaborative site comprises a wiki site.

13. The computer-readable storage medium of claim 10, wherein monitoring the second version of the document contained on the collaborative site is performed using a dedicated listener process that exclusively monitors the second version of the document on the collaborative site.

14. The computer-readable storage medium of claim 10, wherein monitoring the second of the document contained on the collaborative site is performed using a dedicated listener process that exclusively monitors a particular class of documents, and wherein second version of the document contained on the collaborative site is a member of the particular class of documents.

15. The computer-readable storage medium of claim 10, wherein the at least one modification to the second version of the document on the collaborative site comprises a change to contents of the second version of the document.

16. The computer-readable storage medium of claim 10, wherein the at least one modification to the second version of the document on the collaborative site comprises a change to an attachment associated with the second version of the document.

17. The computer-readable storage medium of claim 16, wherein the attachment has changed if one or more file properties of the attachment have changed.

18. A system, comprising:

a computer processor; and a memory containing a program that, when executed on the computer processor, performs an operation comprising:

synchronizing a first version of a document stored in a content management system with a second version of the document contained on a collaborative site, upon detecting at least one modification to the second version of the document, comprising:

monitoring the second version of the document contained on the collaborative site using a dedicated listener process that has a predefined association to the second version of the document, and that monitors for changes to the second version of the document and does not monitor other documents on the collaborative site;

detecting the at least one modification to the second version of the document using the dedicated listener process, wherein the second version of the document on the collaborative site is editable by a plurality of users of the collaborative site, and wherein the at least one modification is received from a first user of the plurality of users of the collaborative site; and upon detecting the at least one modification to the second version of the document on the collaborative site, updating the first version of the document stored in the content management repository, based on the at least one modification to the second version of the document, and using credentials of an authorized user of the content management repository, wherein the authorized user of the content management repository is different from the first user of the collaborative site.

19. The system of claim 18, wherein updating the first version of the document stored in the content management repository is implemented utilizing Web-based Distributed Authoring and Versioning (WebDAV) protocol.

20. The system of claim 18, wherein monitoring the second version of the document contained on the collaborative site is performed using a dedicated listener process that exclusively monitors the second version of the document on the collaborative site.

21. The system of claim 18, wherein monitoring the second version of the document contained on the collaborative site is performed using a dedicated listener process that exclusively monitors a particular class of documents, and wherein second version of the document contained on the collaborative site is a member of the particular class of documents.

* * * * *